United States Patent [19]

Cheng

[11] Patent Number: 5,245,119
[45] Date of Patent: Sep. 14, 1993

[54] METHOD FOR FORMING RECLAIMED LAND BY TRASH AND WASTE TIRES WITHOUT POLLUTING WATER AND A DEVICE FOR LOADING TRASH

[76] Inventor: I P. Cheng, 2nd Fl., No. 2, Alley 23, Lane 27, Chung Hsin St., Pei Tou Dist., Taipei, Taiwan

[21] Appl. No.: 921,298

[22] Filed: Jul. 28, 1992

[51] Int. Cl.$^5$ .............................................. B09B 1/00
[52] U.S. Cl. ................................... 588/250; 383/113; 405/128; 405/129; 428/35.2
[58] Field of Search ................................... 405/15–19, 405/21, 23, 25, 128, 129; 383/109, 113, 119, 127; 428/35.2; 588/249, 250

[56] References Cited

U.S. PATENT DOCUMENTS

| | | | |
|---|---|---|---|
| 1,275,859 | 8/1918 | Cunningham | 405/17 |
| 4,405,257 | 9/1983 | Nielsen | 405/19 |
| 4,518,507 | 5/1985 | Conner | 405/129 X |
| 4,668,128 | 5/1987 | Hartley et al. | 405/128 X |
| 4,878,446 | 11/1989 | Vermeulen | 405/17 X |
| 5,120,161 | 6/1992 | Faussone | 405/129 |

*Primary Examiner*—Dennis L. Taylor
*Assistant Examiner*—John Ricci
*Attorney, Agent, or Firm*—Merchant Gould Smith Edell Welter & Schmidt

[57] ABSTRACT

A method for treating trash and waste tires provides a bag-like container for loading trash consisting of two "tire-nets" sandwiching a plastic layer therebetween. The tire-net is formed by a plurality of wires passing through a plurality of aligned waste tires. Trash is filled into the bag-like container via its open end to a predetermined extent. Sea water is introduced into the container during and after trash-filling to sterilize the trash therein. The used sea water is pumped out of the container to a waste water treating apparatus to avoid pollution. After filling, the container is enveloped to form a sealed unit, and is then used to fill an area of sea to be reclaimed. The plastic layer is preferably made of acidproof and alkalineproof material to insure an effective and long-lasting sealing.

5 Claims, 6 Drawing Sheets

METHOD FOR FORMING RECLAIMED LAND BY TRASH AND WASTE TIRES WITHOUT POLLUTING WATER AND A DEVICE FOR LOADING TRASH

BACKGROUND OF THE INVENTION

The present invention relates to a method for forming reclaimed land by trash and waste tires and to a device for loading trash.

Trash treatment is a big problem today. In addition to the cost, land and/or air pollution is an inevitable result regardless of whether trash is treated by burying or burning. Another tricky problem encountered is the treatment of waste tires which may take hundreds of years to decompose and whose number is constantly increasing.

The invention provides a method to resolve the treatment problems of trash and waste tires without pollution and to obtain reclaimed land using the treated waste tires and trash.

SUMMARY OF THE INVENTION

The invention provides a bag-like container with an open end for loading trash. The container includes two bag-like "tire-nets" which sandwich a bag-like plastic layer therebetween. The tire-net is formed by a plurality of wires passing through a plurality of aligned waste tires. The waste tires used here have been previously cleaned and sterilized. Trash is filled into the bag-like container via its open end to a pre-determined extent.

Sea water is introduced into the container during and after trash-filling to sterilize the trash therein. The used sea water is pumped out of the container to a waste water treating apparatus to avoid pollution. After the filling, the container is enveloped to form a sealed unit, and is ready for filling an area of sea to be reclaimed. The plastic layer is preferably made of acidproof and alkalineproof material to insure an effective and long-lasting sealing.

The present invention also provides a trash-filling station at which trash is loaded into the container set forth above. The station includes a hoist means and an annular hook means with an upper end thereof hoisted by said hoist means via a plurality of chains and a plurality of peripheral hooks for hooking tires located on top of the outer tire-net.

Other advantages and novel features of the invention will become more apparent from the following detailed description when taken in conjunction with the accompanying drawings.

DETAILED DESCRIPTION OF THE PREFERRED EMBODIMENTS

Figure 1:
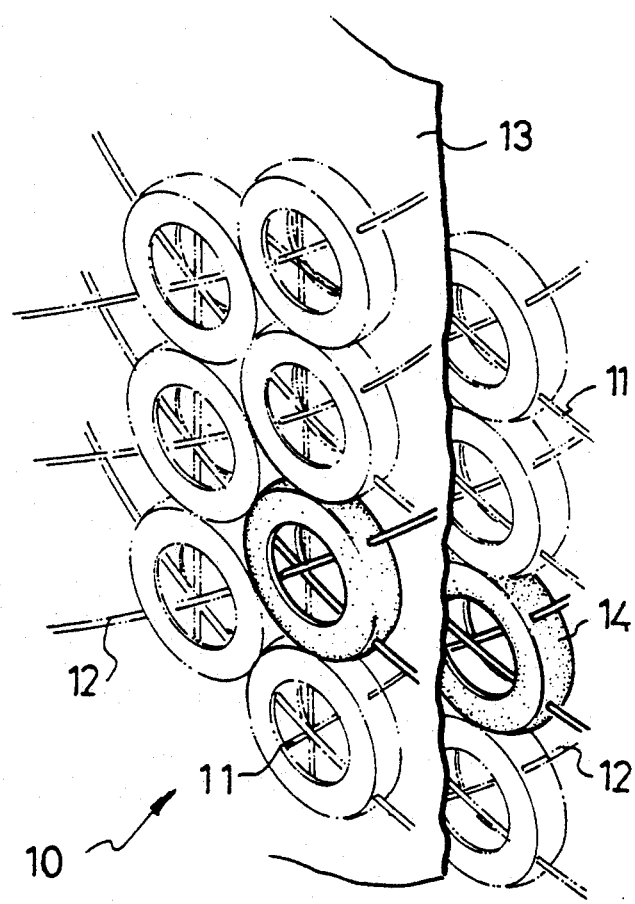
FIG. 1 is a schematic view showing a container for loading trash in accordance with the present invention.
Figure 2:
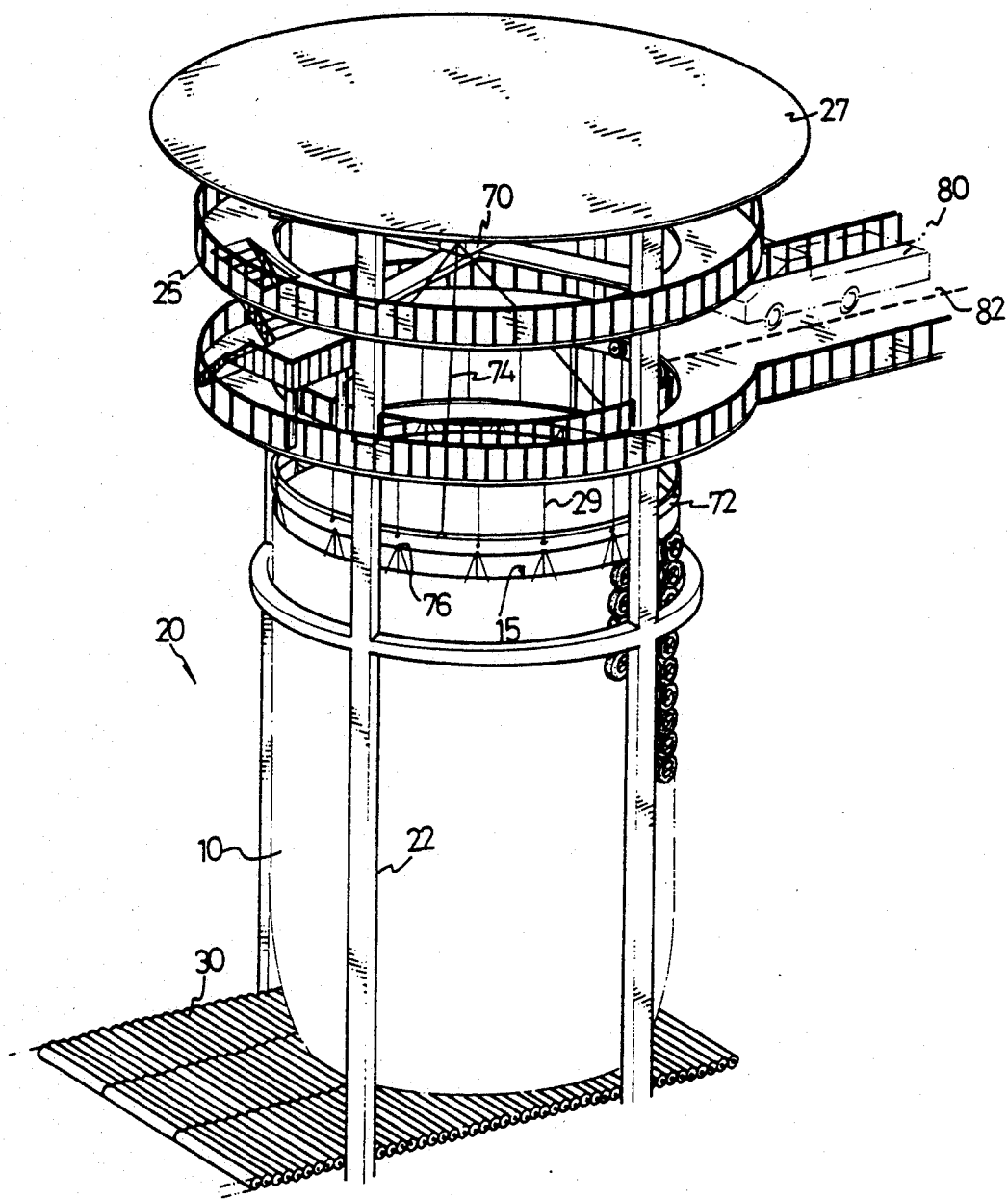
FIG. 2 is a trash-filling station in accordance with the present invention.

Referring to FIGS. 1 and 2, the invention provides a bag-like container 10 with an open end 15 for loading trash. The container 10 includes two bag-like "tire-nets" 11 which sandwich a bag-like plastic layer 13 therebetween. The tire-net 11 is formed by a plurality of wires 14 passing through a plurality of aligned waste tires 12. The waste tires 12 used here have been previously cleaned and sterilized. Trash is filled into the bag-like container 10 via its open end 15 to a pre-determined extent.

FIG. 2 shows a trash-filling station 20 in accordance with the present invention which includes a hoist means 70 and an annular hook means 72 with an upper end thereof hoisted by the hoist means 70 via a plurality of chains or cables 74. The annular hook means 72 further has a plurality of peripheral hooks 76 for hooking tires located on top of the outer tire-net 11. As shown in FIG. 2, trash cars 80 may reach the trash-filling station 20 by a road 82 built therefor. The trash-filling station also has a post means 22 to assist the support of the "trash-bag" 10 and corridors 25 for workers. In this embodiment, the annular hook means 72 is suspended to the inner peripheral wall of the lower corridor 25 by means of a plurality of wires 29, thereby providing a reinforced arrangement for supporting the container 10 during trash-loading. A rain-shield 27 may be provided to shield the trash-filling station 20.

Figure 3:
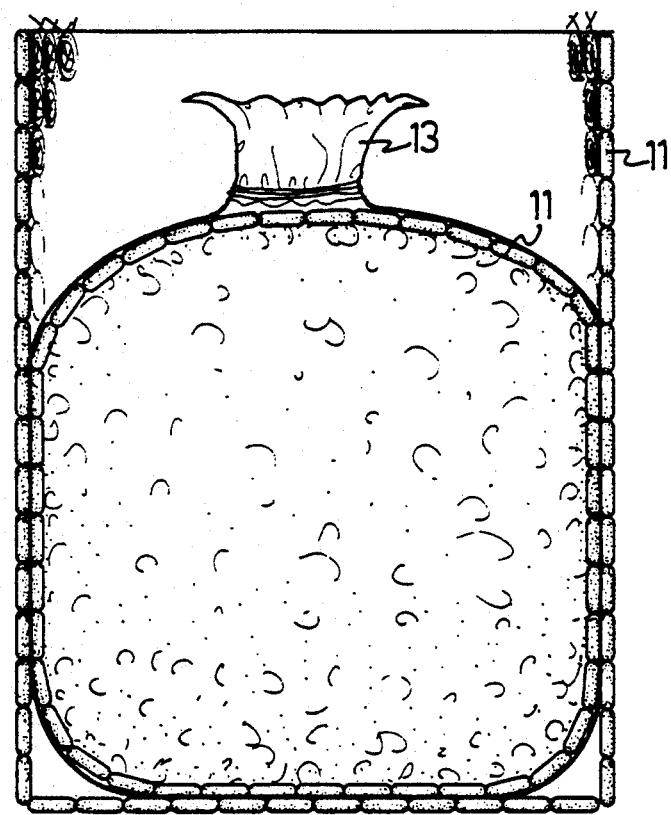
FIG. 3 is a schematic view showing enveloping of the container.
Figure 4:
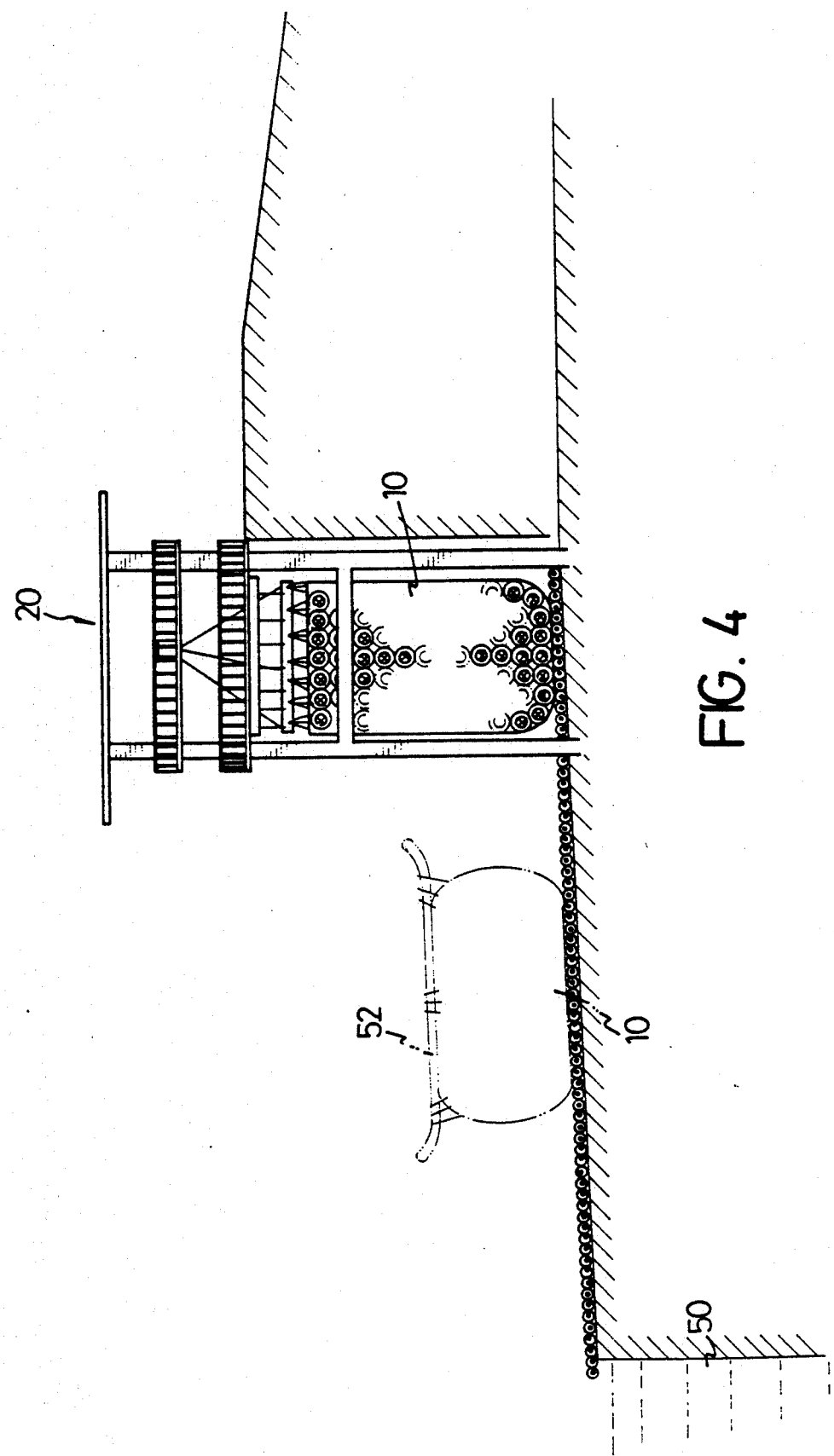
FIG. 4 is a schematic view showing transportation of filled container to an artificial lake area.
Figure 5:
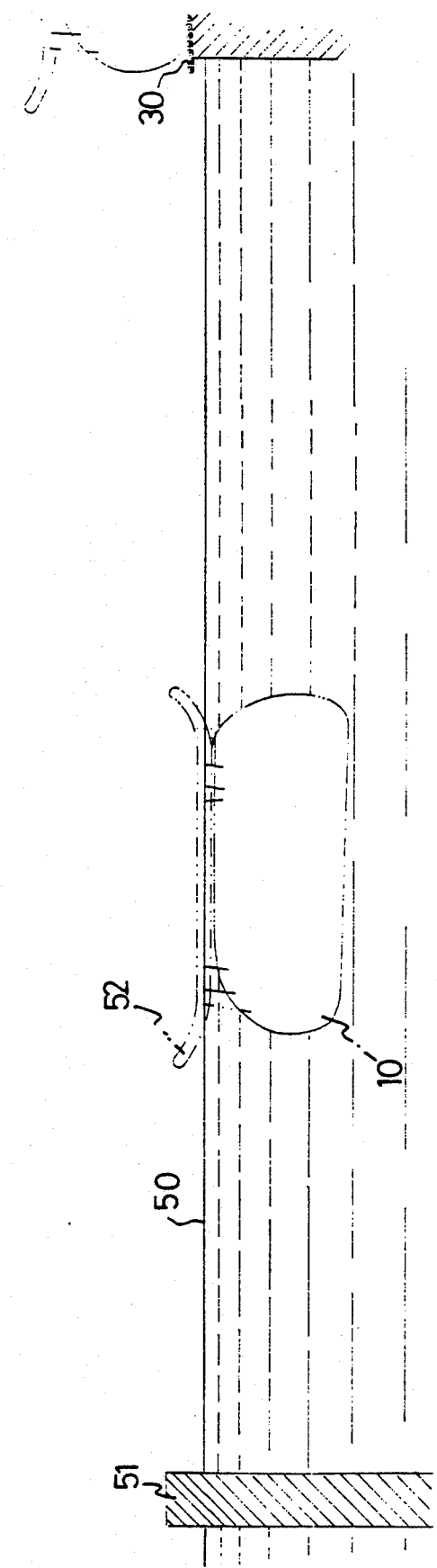
FIG. 5 is a schematic side view showing a filled container floating in the artificial lake area.
Figure 6:
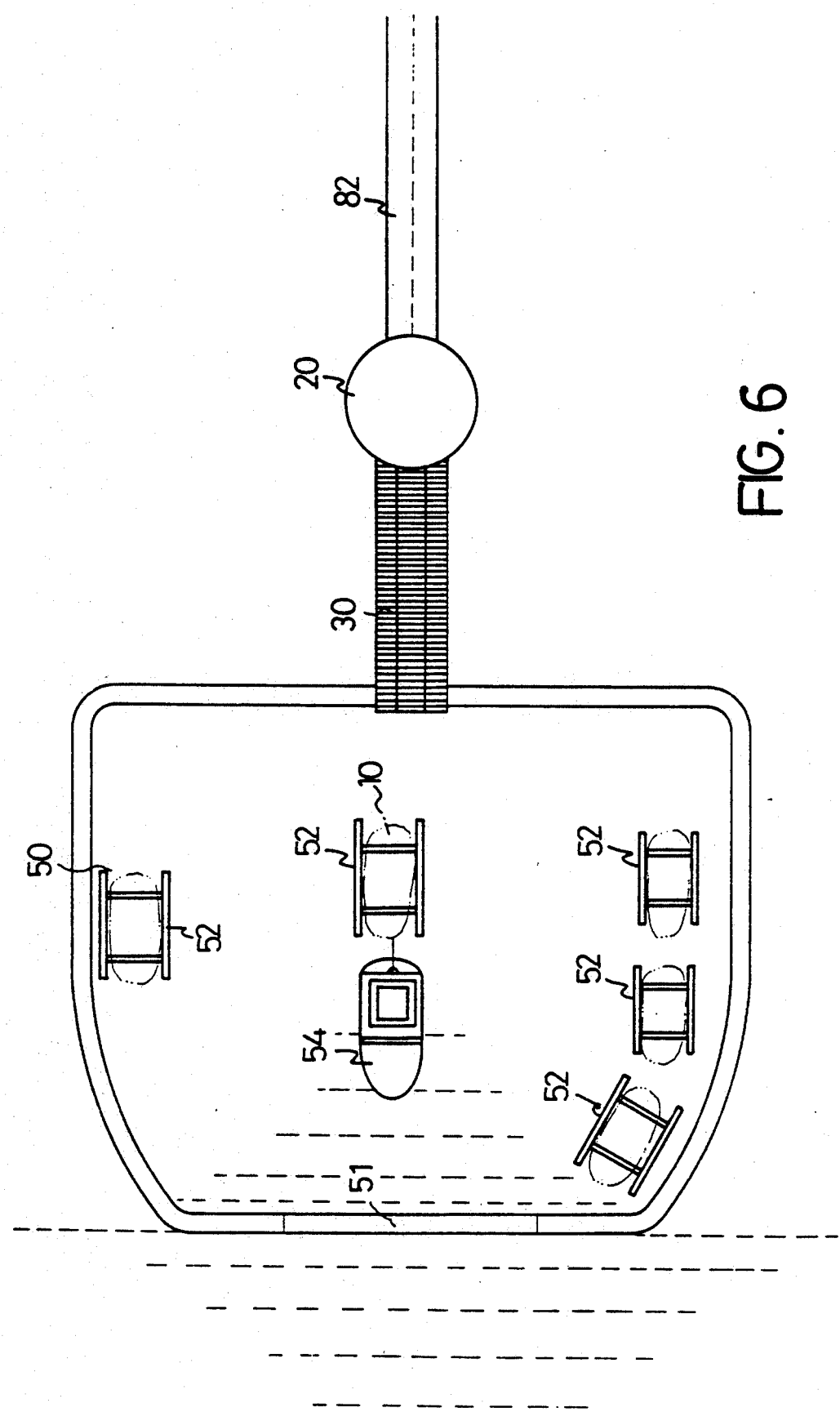
FIG. 6 is a schematic top plan view showing an artificial lake area for storing filled containers before reclamation.

Sea water is introduced into the container 10 during and after trash filling to sterilize the trashes therein. After sterilization, the used sea water is pumped out of the container 10 to a waste water treating apparatus (not shown) to avoid secondary pollution. After the filling, the container 10 is enveloped to form a sealed unit, and is then ready for filling an area of sea to be reclaimed. In this embodiment, the sealing is achieved by knotting the cables of the inner tire-net 11, tying the plastic layer 13, and knotting the cables of the outer tire-net 11 (see FIG. 3). The plastic layer 13 is preferably made of acidproof and alkalineproof material to insure an effective and long-lasting sealing.

After the enveloping, the filled container is conveyed from the filling station 20 to an artificial lake area 50 via a conveyor means 30 and is temporarily stored in the sea water of the artificial lake area 50. A float 52 is attached to the filled container 10 so that the latter may float for subsequent drafting by boats. Preferably, the surface level of the artificial lake area 50 is built between the daily high tide line and the daily low tide line. When reclamation of land is in progress, the containers 10 are moved to and sunk into the sea area to be reclaimed. The lake area 50 is preferably located near the land to be reclaimed and has a gate 51 allowing drafting-boats 54 (used for drafting containers to the land reclamation location) to pass through. When reaching the sea area to be reclaimed, after removing the float, the containers 10 are accordingly piled up in the sea water to be reclaimed to a desired extent, e.g., to a depth of about 10 meters below the sea level. Thereafter, an anchoring means (not shown) can be provided to anchoring the containers 10 to avoid displacement by the tide.

Although the invention has been explained in relation to its preferred embodiment, it is to be understood that many other possible modifications and variations can be made without departing from the spirit and scope of the invention as hereinafter claimed.

I claims:

1. A method for forming reclaimed land comprising the steps of:
    (a) forming a bag-like container consisting of an inner tire net, an outer tire net, and a plastic layer of acidproof and alkalineproof material sandwiched between said inner and outer tire nets, each of said inner and outer tire nets being constructed by a plurality of wires passing through a plurality of aligned waste tires;
    (b) filling trash into said container;
    (c) introducing sea water into said container to sterilize said waste tires and trash, and pumping said sea water out of said container after sterilization,
    (d) sealing said container after said container is filled to a pre-determined extent; and
    (e) using said filled containers to fill an area of sea to be reclaimed.

2. A device for filling trash into the container set forth in claim 1, comprising:
    a hoist means,
    an annular hook means having an upper end hoisted by said hoist means and a plurality of peripheral hooks each for hooking tires located on top of said outer tire-net.

3. A system for forming reclaimed land comprising:
    a bag-like container for loading trash, consisting of an inner tire net, an outer tire net, and a plastic layer of acidproof and alkalineproof material sandwiched between said inner and outer tire nets, each of said inner and outer tire nets being constructed by a plurality of wires passing through a plurality of aligned waste tires;
    a trash-filling station including:
        a hoist means, and
        an annular hook means having an upper end hoisted by said hoist means and a plurality of peripheral hooks each for hooking tires located on top of said outer tire-net;
    an artificial lake area for storing filled containers, including a gate through which a boat for drafting said filled container to the location where land reclamation is required is navigable; and
    a conveyor means for conveying said filled container from said trash-filling station to said artificial lake area.

4. The system as claimed in claim 3, wherein the surface level of said artificial lake area is built between the daily high tide line and the daily low tide line.

5. The system as claimed in claim 3, wherein a rain shield is provided above said trash-filling station.

* * * * *